United States Patent Office 3,631,058
Patented Dec. 28, 1971

3,631,058
PROCESS FOR THE PRODUCTION OF CHLORINATED N-METHYL IMIDAZOLES
Gunther Beck and Hans Holtschmidt, Leverkusen, Germany, assignors to Farbenfabriken Bayer Aktiengesellschaft, Leverkusen, Germany
No Drawing. Filed July 11, 1968, Ser. No. 743,973
Claims priority, application Germany, Aug. 19, 1967, F 53,287
Int. Cl. C07d 49/36
U.S. Cl. 260—309
11 Claims

ABSTRACT OF THE DISCLOSURE

Chlorinated N-methyl imidazoles are obtained by chlorinating dimethylamino acetonitrile in an inert solvent at temperatures of up to 150° C. by raising the chlorination temperature by about 10 to 20° C. per hour.

---

The compounds have fungicidal properties and are also useful in the preparation of plant protective agents and dyes.

This invention relates to a process for the production of chlorinated N-methyl imidazoles.

Belgian patent specification 622,382 discloses the chlorination of compounds of the formula

in which $R_1$ and $R_2$ represent alkyl or aryl groups which may bear halogen or cyano substituents and
$R_3$ represents a methyl or an aryl group.

Isocyanide dichlorides are obtained by this process. The reaction is carried out at temperatures below 140° C. until all the replaceable hydrogen atoms have been chlorinated and is then continued at temperatures between 140 and 300° C., to from the isocyanide dichlorides.

It has now surprisingly been found that chlorinated N-methyl imidazoles can be obtained from dimethylamino acetonitrile by chlorination in an inert chlorinated aliphatic hydrocarbon as solvent if the chlorination is carried out at temperatures of up to 150° C., optionally under UV irradiation, and the chlorination temperature is raised by about 10 to 20° C. per hour.

Accordingly the invention provides a process for the preparation of chlorinated N-methyl imidazoles, in which dimethylamino acetonitrile, in a chlorinated hydrocarbon solvent, is treated with gaseous chlorine and is subsequently heated at temperatures of up to 150° C. while chlorine is passed through the mixture and in which the temperature of the chlorination is raised by 10° to 20° C. per hour.

The process is generally carried out by dissolving dimethylamino acetonitrile in the chlorinated aliphatic hydrocarbon at room temperature and then introducing excess chlorine while the temperature is raised slowly (10 to 20° C. per hour). The solvent used is preferably chloroform. The reaction may also be carried out under UV irradiation. When the boiling point of the chlorinated aliphatic hydrocarbon is reached, this hydrocarbon slowly distils off so that the chlorinated imidazoles are left behind at the end of the reaction. A mixture of the following compounds is obtained:

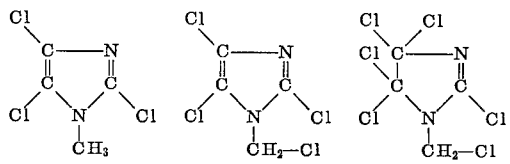

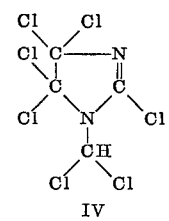

One of these compounds may be formed preferentially, depending on the reaction conditions. The composition of the mixture becomes richer in compounds (III) and (IV) as the chlorination time is increased.

The maximum reaction temperature used is of special importance with regards to the proportion of the individual compounds (I to IV). In order to obtain a high proportion of compound I, it is advisable to use a maximum temperature below 80° C., and preferably between 45 to 65° C. This reaction is preferably carried out in boiling chloroform. In order to obtain a predominance of type II compounds, the maximum temperature should be between 80 and 120° C., and preferably between 90 and 100° C. In order to obtain a predominance of compounds III and IV, maximum temperatures in the region of 130° C. are preferred, and for IV temperatures of about 140° C. are preferred.

The invention also provides compounds II to IV which are new.

The compounds may be used as intermediate products for the preparation of plant protective agents and dyes. The compounds themselves have fungicidal properties.

The compounds of this invention are further useful as total or selective herbicides. If used in the common pre-emergence test for herbicides they destroy Chenopodium, Echinochloa, Sinapis, oat, wheat and cotton when applied 24 hours after sowing in an amount of 50 kg./ha.

If only 5 kg./ha. are applied under the same conditions Chenopodium, Echinochloa and Sinapis are destroyed also within 20 days, whereas oat, wheat and cotton are uneffected. Tests have been carried out with various of the compounds of this invention and especially with N-chloromethyl-2,4,5-trichloroimidazole.

EXAMPLE 252 g. (3.0 mol) of dimethylamino acetonitrile and 3 litres of chloroform are introduced into a 4-litre 3-necked flask which is equipped with a thermometer, gas inlet tube, stirrer and reflux condenser. A stream of dry chlorine is introduced into the well-stirred reaction mixture through the gas inlet tube, starting at about 20° C., the temperature being reduced by external cooling with ice. The rate of supply of chlorine and the rate of cooling are so adjusted that the reaction temperature is maintained between 20 and 30° C. After termination of the exothermic reaction (about 5 hours) the yellow suspension so formed is slowly heated to the reflux temperature of chloroform (55–60° C.) while the chlorination continues and under UV irradiation and the temperature is allowed to rise by approximately 10 to 20° C. per hour. In the later stages of the reaction, different procedures are adopted depending on which chlorinated N-methyl imidazoles are desired as the major products:

(a) The reaction mixtures is further chlorinated for about 20 hours under UV irradiation at the reflux temperature of chloroform. N-methyl-2,4,5-trichloromidazole (I) is separated off at B.P.$_{12}$ 118–123° C. by fractional distillation using a column of 1 m. in height, and is recrystallised from petroleum ether. M.P. 75–76° C., yield about 380 g. (=68% of the theory).

Analysis.—$C_4H_3Cl_3N_2$ (molecular weight 185.4). Calcd. (percent): C, 25.9; H, 1.6; Cl, 57.4; N, 15.1. Found (percent): C, 25.8; H, 1.7; Cl, 57.3; N, 15.2.

(b) The reaction mixture is heated to 100° C. by slowly raising the temperature (about 10 to 20° C. per hour) under UV irradiation while the chloroform is distilled off at the same time, and the reaction mixture is then kept at about 100° C. for about 15 to 20 hours while chlorine is still introduced. N-chloromethyl-2,4,5-trichloroimidazole (II) can then be separated (B.P.$_{12}$ 131° C.) by fractional distillation in a column of 1 m. in height. After recrystallisation from petroleum ether, the substance melts at 55 to 56° C. Yield about 390 g. (=59% of the theoretical).

Analysis.—$C_4H_2Cl_4N_2$ (molecular weight 219.9). Calcd. (percent): C, 21.9; H, 0.9; Cl, 64.5; N, 12.7. Found (percent): C, 21.8; H, 1.0; Cl, 64.6; N, 12.6.

(c) The reaction mixture is further chlorinated while the temperature is slowly raised (about 10 to 20° C. per hour) to 140° C. under UV irradiation and simultaneous removal of the chloroform by distillation, and it is then kept at about 140° C. for 15 to 20 hours while more chlorine is introduced. On cooling of the reaction mixture, N - dichloromethyl - 2,4,4,5,5-pentachloro-imidazoline-(2) (IV) crystallises out, and after recrystallisation from petroleum ether this melts at 108 to 109° C. Yield about 360 g. (=35% of the theoretical).

Analysis.—$C_4HCl_7N_2$ (molecular weight 325.2). Calcd. (percent): C, 14.8; H, 0.3; Cl, 76.3; N, 8.6. Found (percent): C, 14.8; H, 0.4; Cl, 76.0; N, 8.5.

The mother liquor of compound (IV) is subjected to fractional distillation in a column of 1 m. in height. N-chloromethyl - 2,4,4,5,5-pentachloroimidazoline-(2) (III) is isolated (B.P.$_{0.25}$ 93° C.). Yield about 240 g. (=37.5% of the theoretical). A further 60 g. (=6.7% of the theoritical of compound (IV) are isolated at B.P.$_{0.2}$ 101° C. The yield of compound (III) can be increased to about 45% of the theoretical if the last stage of chlorination (20 hours) is carried out in the temperature region of about 120 to 130° C., the proportion of (IV) decreases correspondingly.

What we claim is:

1. A process for the preparation of chlorinated N-methyl imidazoles, in which dimethylamino acetonitrile, in an inert chlorinated aliphatic hydrocarbon solvent, is treated with gaseous chlorine and is subsequently heated at temperatures of up to 150° C. and irradiated with U.V. light while chlorine is passed through the mixture and in which the temperature of the chlorination is raised by 10° to 20° C. per hour.

2. A process as claimed in claim 1 in which chloroform is the chlorinated hydrocarbon solvent.

3. A process as claimed in claim 1, in which the heating stage is conducted at the temperature of boiling chloroform.

4. A process as claimed in claim 1, in which the maximum chlorination temperature is between 80° and 120° C.

5. A process as claimed in claim 4 in which the maximum temperature is between 90° C. and 100° C.

6. A process as claimed in claim 1 in which the maximum chlorination temperature is between 120° C. and 150° C.

7. A process as claimed in claim 6 in which the maximum temperature is approximately 130° C.

8. A process as claimed in claim 6 in which the maximum temperature is approximately 140° C.

9. N - chloromethyl-2,4,5-trichloroimazole having the formula

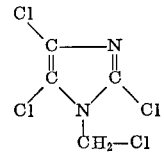

10. N - chloromethyl-2,4,4,5,5-pentachloroimidazoline-(2) having the formula

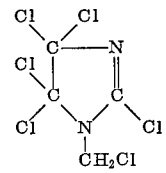

11. N - dichloromethyl-2,4,4,5,5-pentachloro-imidazoline-(2) having the formula

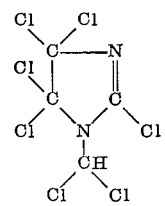

References Cited

UNITED STATES PATENTS 3,435,050   3/1969   Wasco _____ 260—309

OTHER REFERENCES

Kochergin et al., Khim. Geterotsikl. Soedin. Akad. Nauk. Latu. SSR 1965 (3), 402–6.

HENRY R. JILES, Primary Examiner

G. T. TODD, Assistant Examiner

U.S. Cl. X.R.

204—158 HE; 260—309.6; 424—273